United States Patent [19]
Zook et al.

[11] Patent Number: 5,275,055
[45] Date of Patent: Jan. 4, 1994

[54] RESONANT GAUGE WITH MICROBEAM DRIVEN IN CONSTANT ELECTRIC FIELD

[75] Inventors: James D. Zook; David W. Burns, both of Minneapolis, Minn.

[73] Assignee: Honeywell Inc., Minneapolis, Minn.

[21] Appl. No.: 937,068

[22] Filed: Aug. 31, 1992

[51] Int. Cl.⁵ .............................. G01B 7/16
[52] U.S. Cl. ..................... 73/778; 73/702; 73/862.59; 73/DIG. 1; 310/309; 318/116
[58] Field of Search ........... 73/702, 862.59, DIG.; 324/452; 310/309; 318/116

[56] References Cited

U.S. PATENT DOCUMENTS

| | | | |
|---|---|---|---|
| 3,164,987 | 1/1965 | Davidson et al. | 73/DIG. 1 X |
| 3,413,573 | 11/1968 | Blake et al. | 73/862.59 |
| 3,470,400 | 9/1969 | Weisbord | 310/15 |
| 3,486,383 | 12/1969 | Riordan | 73/517 |
| 3,657,667 | 4/1972 | Nishikubo et al. | 331/116 M |
| 3,769,531 | 10/1973 | Elkuch | 310/309 |
| 4,801,897 | 1/1989 | Flecken | 331/65 |
| 5,090,254 | 2/1992 | Guckel et al. | 73/778 |

*Primary Examiner*—Jerry W. Myracle

[57] ABSTRACT

A resonant strain gauge includes a silicon substrate, a polysilicon flexure beam attached at both ends to the substrate, and a polysilicon rigid cover cooperating with the substrate to enclose the flexure beam within a sealed vacuum chamber. An upper bias electrode is formed on the cover, and a lower bias electrode is formed on the substrate directly beneath and spaced apart from the flexure beam. A drive electrode is formed in or on the beam, centered between the upper and lower bias electrodes transversely with respect to the direction of beam elongation. The upper and lower electrodes are biased at constant voltage levels, of equal magnitude and opposite polarity. The drive electrode, ordinarily biased at ground, is selectively charged by applying an oscillating drive voltage, to cause mechanical oscillation of the beam. A piezoresistor element, formed on the beam, senses beam oscillation and provides a position indicating input to the oscillator circuit that drives the beam. The beam tends to oscillate at its natural resonant frequency. The piezoresistor thus provides the natural resonant frequency to the oscillating circuit, adjusting the frequency of the beam drive signal toward coincidence with the natural resonant frequency. A shield electrode can be formed on the flexure beam between the piezoresistor and the drive electrode, to insure against parasitic capacitance. In alternative embodiments, the drive signal is applied to one of the bias electrodes to oscillate the beam, and beam oscillation is sensed capacitively.

44 Claims, 4 Drawing Sheets

RESONANT GAUGE WITH MICROBEAM DRIVEN IN CONSTANT ELECTRIC FIELD

BACKGROUND OF THE INVENTION

The present invention relates to transducers that utilize induced strain as a means for measuring acceleration, pressure, temperature and other variables, and more particularly to transducers employing resonant beams as sensors.

Resonant sensors have been used for many years to achieve high accuracy measurements. Vibrating transducers have been used in accelerometers, pressure transducers, mass flow sensors, temperature and humidity sensors, air density sensors and scales. These sensors operate on the principle that the natural frequency of vibration (i.e. resonant frequency of an oscillating beam or other member) is a function of the induced strain along the member. More particularly, tensile forces tending to elongate the beam increase its resonant frequency, while forces tending to compress the beam reduce the natural frequency. The frequency output of resonant gauges is readily converted to digital readings reflecting the measured quantity, requiring only a counter and a reference clock for this purpose. Thus, such gauges are simple and reliable, providing a high degree of discrimination while using a relatively simple sensor to digital interface.

An exemplary use of a vibrating beam transducer is shown in U.S. Pat. No. 3,486,383 (Riordan). A pair of parallel beams are employed to limit the angular movement of the gimbal of a gyro. Angular movement in one direction tends to compress the vibrating beams, while angular movement in the opposite direction tends to place the beams under tension. Changes in natural frequency of the beams provide a direct indication of gimbal angular movement.

U.S. Pat. No. 5,090,254 (Guckel et al) discloses a resonant beam transducer including a polysilicon beam mounted to a substrate for vibration relative to the substrate, and a polysilicon shell surrounding the beam and affixed to the substrate to form a cavity which is sealed and evacuated. The beam is oscillated by supplying an oscillating voltage to an electrode on the shell.

U.S. Pat. No. 3,657,667 (Nishikubo et al) discloses a mechanical vibrator having three parallel arms and three piezoelectric elements, one glued to each of the arms. The element on one of the outer arms is used to drive the vibrator, while the remaining piezoelectric elements provide a pair of sensors. The sensors provide an input to an amplifier, with the output of the amplifier being provided to the drive piezoelectric element.

Resonating members also have been driven magnetically. In U.S. Pat. No. 4,801,897 (Flecken), a magnet is mounted to each of two parallel fluid carrying tubes. A coil magnet, positioned between the two tube magnets, is actuated by an excitation circuit to oscillate the tubes. Optical sensors determine the positions of the oscillating tubes, and provide position information as input to the excitation circuit.

A dual vibrating beam force transducer is shown in U.S. Pat. No. 4,901,586 (Blake et al). A pair of parallel beams are positioned between a pair of electrodes. A drive circuit provides an oscillating voltage to the electrodes to electrostatically drive the beams, causing the beams to oscillate in a plane containing both beams. The mechanical resonance of the beams controls the oscillation frequency. In an alternative embodiment (shown in Blake's FIG. 7), one of two parallel beams is grounded while a drive circuit applies an oscillating voltage to the other beam, thus electrostatically oscillating both beams.

One of the primary advantages of resonant gauges is that the resonant frequency depends only on the geometrical and mechanical properties of the oscillating beam, and is virtually independent of electrical properties. As a result, precise values (e.g. resistance and capacitance) of drive and sense electrodes are not critical. A possible disadvantage is that any parasitic coupling between the drive and sense electrodes may diminish accuracy of the resonant gauge. Furthermore, in a conventional capacitive drive arrangement, the force between the oscillating beam and drive electrode is quadratic, resulting in an unwanted frequency pulling effect. While crystalline quartz piezoresistors have been satisfactorily employed in resonant gauge applications, their size limits their practical utility.

Therefore, it is an object of the present invention to provide a resonant beam sensing device in which drive electrodes and sense electrodes are isolated from one another in a manner to virtually eliminate parasitic capacitance between them.

Another object of the invention is to provide a resonant gauge in which the force applied to the drive electrode is linear rather than quadratic, whereby the applied force can be varied in a manner that more closely approximates the behavior of the oscillating beam.

A further object of the invention is to provide a resonant beam strain sensing device with a high degree of discrimination for accurately sensing even slight changes in resonant frequency.

Yet another object is to provide a resonant gauge of microscopic dimensions for use in applications where space is severely limited.

SUMMARY OF THE INVENTION

To achieve these and other objects, there is provided an apparatus for sensing variations in strain. The apparatus includes a substantially rigid substrate. A first bias electrode is fixed with respect to a substrate surface portion. A flexure element, elongate in a longitudinal direction, is fixed at a first region with respect to the substrate, leaving a second region of the flexure element free to oscillate at a resonant frequency. The resonant frequency varies with changes in strain due to external forces acting upon the flexure element. The flexure element is transversely spaced apart from the first bias electrode. A beam electrode is formed upon the flexure element. An electrically insulative and substantially rigid cover is fixed with respect to the substrate and has a cover surface portion transversely spaced part from the flexure element. The cover surface portion also is disposed on the opposite side of the flexure element from the substrate surface portion. A second bias electrode is fixed with respect to the cover surface portion. A biasing means maintains the first and second bias electrodes at respective and different first an second substantially constant voltage levels. This generates a substantially uniform and constant electrical field in the region about the flexure element. A position sensing means generates a position signal indicating the position of the flexure element relative to the substrate and the cover. An oscillating means generates a periodically varying drive voltage signal and provides the drive signal to the beam electrode, or to one of the bias electrodes. This causes oscillation of the flexure element relative to the substrate and the cover. The oscillating means also receives the position signal and controllably varies the frequency of the drive signal responsive to variations in the frequency of the position signal. In this manner, the oscillating means adjusts the drive signal frequency toward coincidence with the resonant frequency.

Preferably the drive signal is applied to the beam electrode, with the flexure element comprising a beam fixed at one end or both of its opposite ends, leaving the medial region of the beam free to oscillate.

A distinct advantage arises from generating a uniform and constant electric field using a pair of fixed electrodes, while driving the flexure member with an oscillating voltage supplied to a drive electrode on the beam. More particularly, when a sinusoidal drive voltage is applied to the beam, a charge is injected into the drive electrode. A positive voltage provides a positive charge to deflect the beam toward the negative electrode. On the other hand, a negative voltage applied to the beam deflects the beam in the opposite direction, toward the positive bias electrode. The force is proportional to the drive voltage, the bias field, and the drive electrode capacitance. With the latter two values essentially remaining constant, the force is proportional to the drive voltage and varies linearly with the drive voltage. Accordingly, the frequency pull effect of a quadratic drive force is eliminated.

Preferably the drive signal varies about a center voltage level approximately midway between the first voltage level and the second voltage level. More preferably, the center voltage level is equal to ground, with the first and second voltage levels being at least approximately equal in level and having opposite polarity. In this event, it is advantageous to locate the flexure member approximately transversely centered between the first and second bias electrodes.

The position sensing means can include a piezoresistor formed on the beam or other flexure member and electrically isolated from the drive electrode. For example, the piezoresistor can be coplanar with and spaced apart from the drive electrode. The piezoresistor preferably is biased symmetrically with respect to ground. The drive electrode is "normally" at ground in the sense that the drive voltage is oscillated about ground. This eliminates a DC bias between the piezoresistor and the drive electrode, and thus eliminates any electrostatic deflection that might arise due to such bias.

The bias electrodes act as shields for AC voltages, and thus reduce any parasitic capacitance between the drive electrode and the sense electrode (piezoresistor). To further reduce the chance for such parasitic coupling, an auxiliary shield electrode can be formed on the beam between the drive electrode and the piezoresistor. The shield electrode is maintained at a fixed d.c. potential and at a.c. ground, and forms a "Faraday" shield.

The beam or other resonating member preferably oscillates in a vacuum, to minimize external environmental influences upon frequency readings. To this end, the cover and substrate can cooperate to form a fluid tight enclosure containing the beam. The substrate, cover and beam all can be formed of semiconductor materials. More particularly, the preferred substrate is silicon. The beam and cover are formed of separate polysilicon thin films deposited upon the substrate, with appropriate sacrificial layers subsequently removed by etching to define the beam. The beam is microscopic in scale. In one example, the beam has a length of about 300 micrometers, a width of about 30 micrometers and a thickness of about 2 micrometers. The substrate and cover can be sized, such that the entire resonant gauge is substantially smaller than a conventional gauge based on a single crystal piezoresistor, e.g. about 0.5 centimeters in its major dimension. Formation of the oscillatory beam by etching provides the further advantage that the beam and structure directly supporting it are of the same material. This eliminates errors arising due to interfacing of the beam with different materials supporting the beam. The monolithic structure can be formed by combinations of well-known semiconductor processing steps, such as low pressure chemical vapor deposition (LPCVD) for depositing polysilicon and sacrificial layers, and etching steps for removing the sacrificial layers to define the beam. Silane gas, LPCDV silicon nitride or an oxidizing gas can be used to seal the enclosure about the beam. The result is a highly accurate and stable resonant gauge capable of functioning over wide ranges of frequencies and temperature fluctuations. The gauges have been found to be highly sensitive as well, for example exhibiting a ratio of change in frequency to resonant frequency of up to 1500 times strain (change in length divided by nominal length). Thus, resonant gauges in accordance with the present invention are reliable, can be manufactured at relatively low cost, and can be used in a wide variety of demanding applications.

IN THE DRAWINGS

For a further understanding of the above and other features and advantages, reference is made to the following detailed description and to the drawings, in which.

DETAILED DESCRIPTION OF THE PREFERRED EMBODIMENTS

Figure 1:
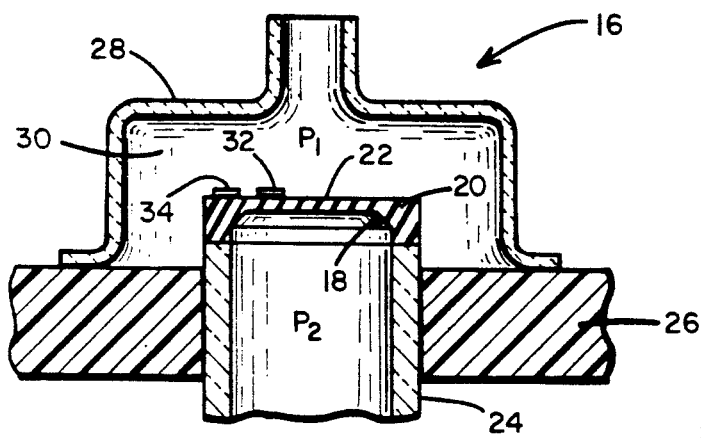
FIG. 1 is an elevational view of a pressure sensing device constructed in accordance with the present invention.
Figure 2:
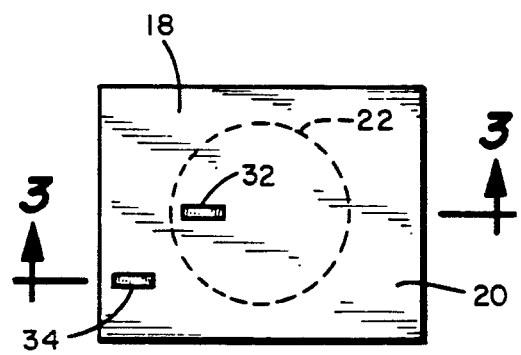
FIG. 2 is a top plan view of the pressure sensing device.
Figure 3:
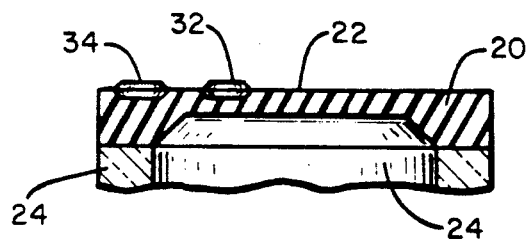
FIG. 3 is a sectional view taken along the line 3—3 in FIG. 2.

Turning now to the drawings, there is shown in FIGS. 1 and 2 a pressure sensing device 16. The device includes a silicon substrate or base 18 including a rigid peripheral rim 20 and a diaphragm 22 surrounded by the rim. The diaphragm has a diameter in the range of 25-100 mils, and is flexible and thin, e.g. having a thickness in the range of 10-80 micrometers. The bottom of rim 20 is thermoelectrically bonded to a tube 24 of Pyrex (brand) glass or other suitable material, e.g. ceramics, mullites, certain plastics and silicon. Tube 24 is supported within a base 26. A cover 28 is fastened to the base, and cooperates with the base to define a chamber 30. Thus, sensing device 16 is positioned at the interface of chamber 30 and the interior of tube 24.

A pressure responsive resonant strain gauge 32 is mounted on the top of sensing device 16, to diaphragm 22 near peripheral rim 20. A substantially similar resonant gauge 34 is mounted to the sensing device at rim 20, and accordingly does not respond to flexure of the diaphragm. Gauge 34 is thus usable as a reference, for "filtering out" any movements of gauge 32 in response to factors other than pressure induced diaphragm flexure, e.g. changes in temperature. As seen in FIG. 2, diaphragm 22 is circular, although it is to be appreciated that the diaphragm can be formed with an alternative shape, e.g. square or rectangular, if desired.

Figure 4:
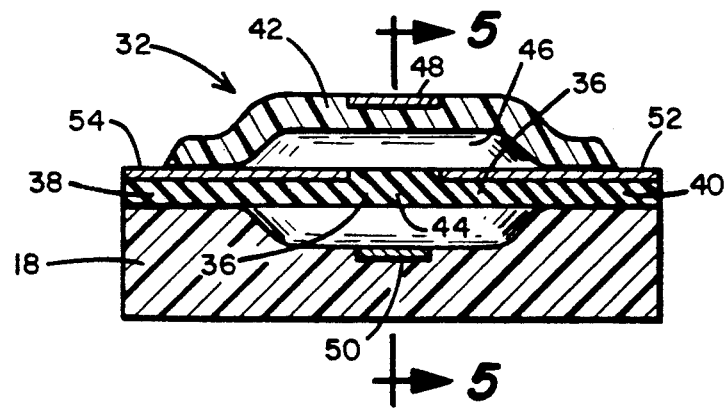
FIG. 4 is an enlarged view of a portion of FIG. 3 showing a resonant gauge of the device.
Figure 5:
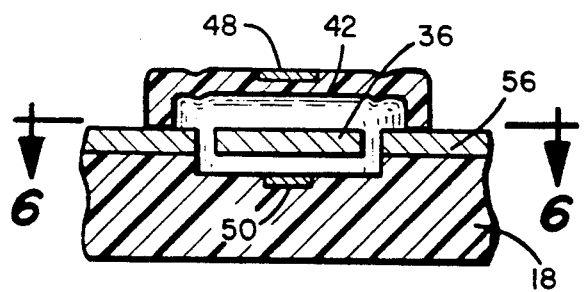
FIG. 5 is a sectional view taken along the line 5—5 in FIG. 4.

As seen in FIG. 4, resonant gauge 32 includes an elongate beam 36 formed of fine grain, low tensile strain polysilicon (polycrystalline silicon). Beam 36 has a length in the range of 100-1,000 micrometers, and more preferably about 200 micrometers, a thickness (vertical direction in FIGS. 4 and 5) of about 2 micrometers, and a width of about 40 micrometers. Opposite ends of the beam, indicated at 38 and 40, are fixed between substrate 18 (more particularly the diaphragm) and a substantially rigid shell or cover 42, also formed of polysilicon. A medial region 44 of the beam is free to oscillate within a chamber 46 formed by the cover and substrate.

An upper bias electrode 48 is formed (e.g. by implantation) onto a surface portion of cover 42, and a similar lower bias electrode 50 is formed onto a surface of diaphragm 22 along the bottom of chamber 46. Electrode 50 is isolated from substrate 18 by fabrication of a PN junction. All electrodes can be isolated from one another by PN junctions or insulative layers, e.g. silicon nitride. A drive electrode 52 is formed along a portion of the top surface of beam 36. A piezoresistor 54 also is formed along the top surface of the beam and is coplanar with drive electrode 52, spaced apart from electrode 52 and therefore electrically isolated from the drive electrode. Bias electrodes 48 and 50 are spaced apart from drive electrode 52 transversely with respect to the length or longitudinal dimension of the beam, with drive electrode 52 approximately transversely centered between the bias electrodes.

Figure 6:
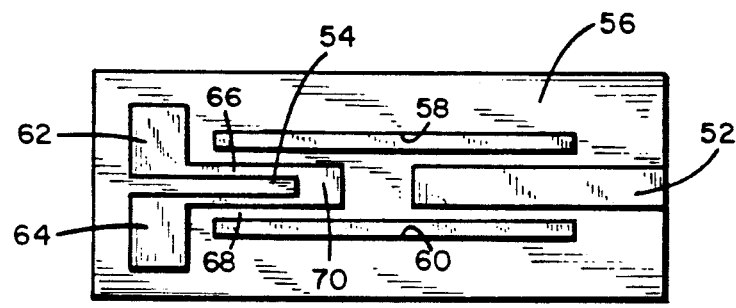
FIG. 6 is a top plan view of a resonating beam of the gauge and its surrounding structure, taken along the line 6—6 in FIG. 5.

As seen in FIG. 6, beam 36 is formed as part of a larger polysilicon thin film 56, with longitudinal gaps 58 and 60 extending along opposite sides of the beam. Drive electrode 52 is substantially rectangular, although the shape is not critical. Piezoresistor 54 includes contact pads 62 and 64, a pair of relatively thin legs 66 and 68. The legs extend into the beam medial region from the pads to an enlarged portion 70 electrically associating the legs. Legs 66 and 68, of course, have a substantially greater resistivity than enlarged portion 70. Accordingly, virtually all of the voltage differential between pads 62 and 64 occurs across the legs, facilitating maintenance of enlarged portion 70 at a desired voltage level, preferably ground.

Pressure sensing device 16 measures a pressure differential (i.e. the difference between pressures $p_1$ and $p_2$ on opposite sides of diaphragm 22), based on the frequency at which beam 36 oscillates. More particularly, flexure of diaphragm 22 produces axial stress upon beam 36, introducing strain along the beam. Downward flexure of diaphragm 22 tends to elongate beam 36 and increase its natural resonant frequency. Conversely, upward diaphragm deflection tends to compress the beam and reduce the resonant frequency.

To maintain the required oscillation of beam 36, a periodically oscillating voltage level is provided to drive electrode 52, while a substantially uniform and constant electrical field is maintained in the region about the beam. To this end, bias electrode 48 is maintained at a constant positive voltage level $+V$, while bias electrode 50 is maintained at a constant voltage level $-V$. In other words, the bias electrodes have voltages of equal magnitude but of opposite polarity. Drive electrode 52 is maintained at ground, with the drive voltage oscillating about ground. When the periodic drive voltage (preferably sinusoidal) is applied to electrode 52, a charge is injected into the drive electrode. A positive voltage injects a positive charge to deflect beam 36 downwardly, due to the attraction between the drive electrode and negative bias electrode 50. A negative voltage deflects beam 36 upwardly, due to the attraction to bias electrode 48. In either case, the attractive force is proportional to the drive voltage, the bias field, and the capacitance of drive electrode 52. Given that the drive electrode capacitance and bias field are substantially constant, the attractive force varies linearly with the drive voltage. While bias electrodes can be maintained at $+15$ volts and $-15$ volts, it has been found satisfactory to maintain the bias electrodes at levels as low as a fraction of a volt, with drive voltage amplitudes of less than 1 millivolt.

The linear behavior is advantageous, in that the sinusoidal oscillation of the drive voltage signal corresponds to the mechanical oscillation of beam 36. By contrast, an approach in which a grounded drive electrode is driven by a periodically oscillating voltage applied to one of the bias electrodes, results in a quadratic force between the bias electrode and the electrode on the beam. This gives rise to an undesirable second harmonic distortion and tendency to drive the beam at twice the applied frequency, and can lead to overdrive of the beam and a shift in resonant frequency or undesirable hysteresis. Thus, a salient advantage of the present invention is the application of an oscillating drive current to the beam within a constant and uniform electric field, whereby the oscillation of the drive signal more closely corresponds to the mechanical oscillations of the beam.

Piezoresistor 54 functions as a means for detecting the instantaneous position of beam 36 relative to the substrate and cover, in generating a detector voltage that varies with the beam position. The manner in which the piezoresistor generates the detector voltage is known in the art, and not further discussed herein.

The detector voltage is provided as an input to an oscillator circuit, the output of which is the periodic drive voltage signal. The drive voltage signal is provided to drive electrode 52 to maintain beam 36 in steady state oscillation at its fundamental resonant frequency. For a polysilicon beam of the microscopic size described, the resonant frequency can be within a range of 100 kHz to 2 MHz, and tends to operate within the narrower range of 200-500 kHz. Since the silicon is not piezoelectric, the beam is driven (i.e. oscillated) by the electrostatic force between each of the bias electrodes and the drive electrode. In either case, one of the bias electrodes and the drive electrode behave as two plates of a capacitor.

Figure 7:
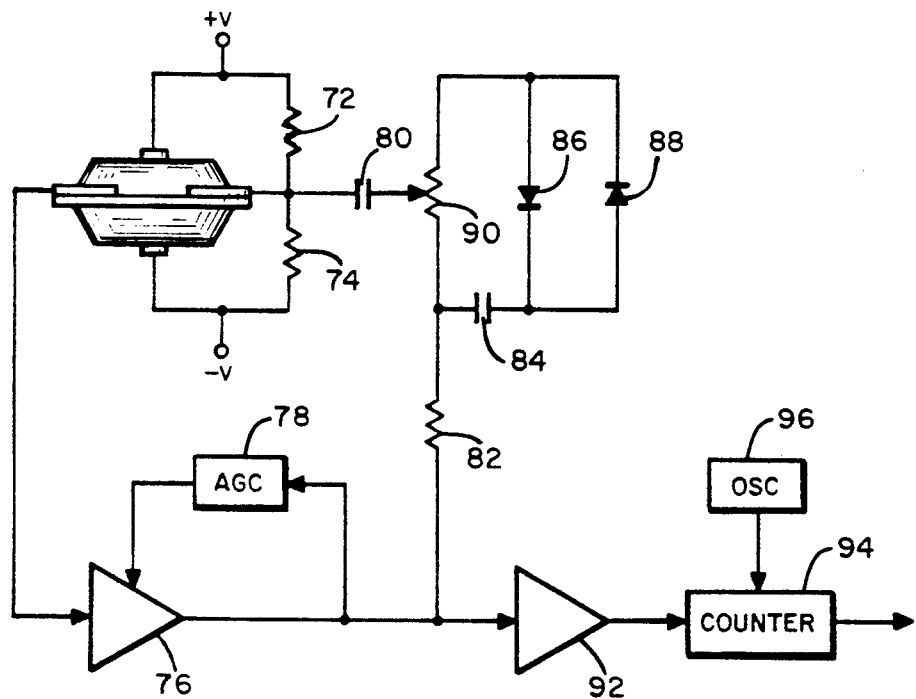
FIG. 7 is a schematic view of the resonant gauge and an associated oscillator circuit.

The oscillator circuit, shown schematically in FIG. 7, provides a closed loop for continually adjusting the frequency of the drive signal toward coincidence with the natural resonant frequency at which beam 36 is oscillating. Bias electrodes 48 and 50 are biased at levels +V and −V, respectively, to generate the required uniform and constant electric field in the region about beam 36, and more particularly about drive electrode 52. Resistances 72 and 74 are approximately equal in value, to bias the drive electrode at ground, i.e. midway between the bias voltage. As beam 36 mechanically oscillates, piezoresistor 54 provides the detector signal as an input to an amplifier 76. The detector signal is an instantaneous reading of the beam position, in the form of a voltage that oscillates at the same frequency as the frequency of beam oscillation. An automatic gain control circuit 78 provides feedback to amplifier 76, to prevent distortion at the oscillation frequency.

The drive voltage signal, provided to drive electrode 52 through a drive capacitor 80, is based upon the output of amplifier 76. More particularly, the amplifier output is coupled through a resistance 82 and a capacitor 84 to a circuit including diodes 86 and 88. The diodes cooperate with resistance 82 to clamp the signal amplitude. The clamp action limits oscillation of beam 36 to amplitudes within the linear response range. A potentiometer 90 enables fine tuning or adjustment of the drive voltage signal, in terms of average amplitude. Other automatic gain control methods are equally applicable, and are known to those skilled in the art.

The output of amplifier 76 also is provided to an output buffer amplifier 92. The buffer amplifier output is provided to a digital counter 94, which also receives a clocking input from an oscillator 96. The output of counter 94 is provided to further digital circuitry, for a direct, real-time reading of strain, pressure, or other parameter that depends upon the resonant frequency of beam 36 as it oscillates.

As noted above, changes in strain along the length (longitudinal dimension) of beam 36 in response to longitudinally applied external forces, alter the natural resonant frequency of the beam. As the beam begins to oscillate at a different frequency in response to a change in strain, the different frequency is sensed in piezoresistor 54, and the detector signal is provided to amplifier 76 at the new frequency. The output of amplifier 76 controls the frequency of the drive voltage signal. In this manner, the drive voltage signal frequency is continually and controllably adjusted toward coincidence with the natural resonant frequency of beam 36. In practice, changes in resonant frequency in terms of a base frequency ($\Delta f/f$) have been found to be in the range of 600–1200 times changes in strain or beam elongation ($\Delta 1/1$). This provides a high degree of accuracy and sensitivity to slight changes in strain. By comparison, a conventional single crystal silicon piezoresistor has a gauge factor typically in the range of about 60–100, depending on doping and orientation. This gauge factor, measured in terms of resistance ($\Delta r/r$) compared to strain ($\Delta 1/1$) in any event is less than about 120.

Pressure sensing devices such as device 16 are manufactured by the equipment already available in the fabrication of semiconductor chips. More particularly, the process begins with a silicon wafer 98 from which a plurality of the sensing devices are fabricated. The material is preferably n-type silicon.

Figure 8:
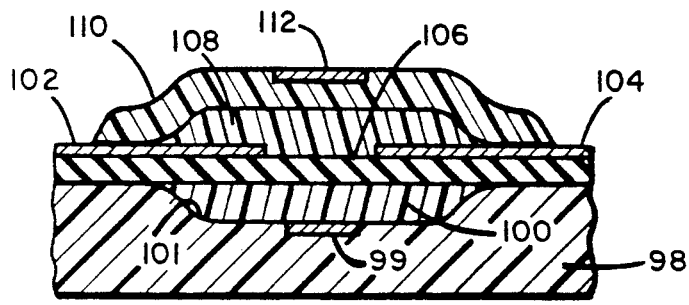
FIGS. 8 and 9 illustrate the resonant gauge at two stages of its fabrication.

The first step involves forming multiple planar troughs on one side of the wafer, one trough corresponding to each device. A bias electrode 99 is formed in each trough 101. A lower sacrificial layer of silicon dioxide ($SiO_2$) is formed by local oxidation as indicated at 100 in FIG. 8. Further oxidation at this stage forms etch channels.

A thin film layer of fine grain, low stress polysilicon 102 is deposited onto the wafer substrate 98 and the sacrificial layer, preferably by low pressure chemical vapor deposition.

Following deposition of polysilicon layer 102, a drive electrode 104, a piezoresistor 106, and the necessary electrical leads for these components are formed upon polysilicon layer 102 by boron implantation, more particularly in the region that eventually comprises a beam 106. Polysilicon is selectively removed from layer 102 by reactive ion etching, to define beam 106 and remove the polysilicon from above the etch channels.

Following the reactive ion etch, a sacrificial layer 108 of low temperature oxide is deposited onto polysilicon layer 102. Then, a second layer of polysilicon 110 is deposited to form a cover. The polysilicon layers preferably are deposited at a temperature of about 580° C., to form an amorphous (rather than polycrystalline) film. After deposition of layer 110, an upper bias electrode 112 is formed by boron ion implantation.

Figure 9:
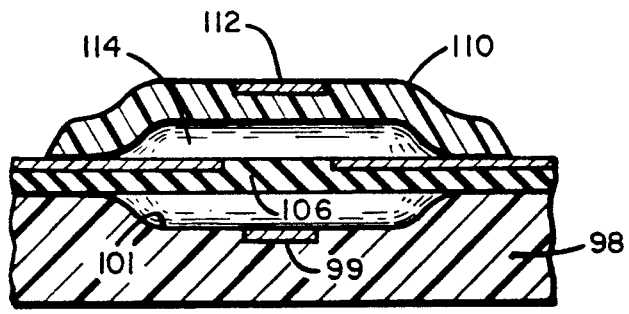

Electrical contact openings and etch channel openings are formed by reactive ion etching. Then, sacrificial layers 100 and 108 are removed by HF etching to form a chamber 114 (FIG. 9). The HF residue is removed by a rinse, preferably a deionized water dilution of cyclohexane. To overcome the tendency of beam 106 to adhere to cover 110 due to the HF residue, the rinse solution is frozen, and later removed in a sublimation step to ensure that beam 106 remains free standing.

At this point, it is necessary to form a vacuum within chamber 114. Operation in a vacuum minimizes the possibility of error due to factors other than changes in strain influencing resonant frequency. The vacuum, and the fluid seal necessary to maintain it, can be achieved by exposure of the chamber and channel surface areas to silane ($SiH_4$) gas. Such exposure causes polysilicon to grow along exposed surface areas until it closes off the channel. Trapped silane gas continues to deposit polysilicon within chamber 114 along the chamber walls, until the silane gas is depleted.

Alternatively, exposed surface areas can be oxidized. The resultant growth of silicon dioxide seals the etched channels. Some of the oxidizing gas remains trapped in chamber 114, and oxidation continues until oxygen within the chamber is depleted.

With the vacuum and seal thus formed, the device is metalized and annealed in a nitrogen atmosphere at about 450° C., to provide electrical contact to the piezoresistor, beam, and bias electrodes.

Finally, the back of the wafer is patterned, e.g. by isotropic etching, to form the diaphragm portion of each pressure sensing device. The wafer is diced into individual chips, whereupon each chip is thermoelectrically bonded to a Pyrex glass tube.

Figure 10:
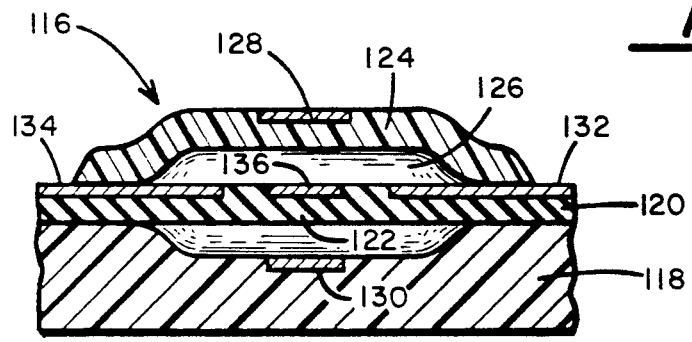
FIG. 10 is a sectioned view of an alternative embodiment resonant gauge.

FIG. 10 shows an alternative resonant gauge 116 including a silicon substrate 118, a polysilicon thin film layer 120 including a beam 122, and a polysilicon cover 124 cooperating with the substrate to enclose beam 122 within a vacuum chamber 126. Upper and lower bias electrodes are formed onto the cover and substrate at 128 and 130, respectively. A drive electrode 132 and a position sensing piezoresistor 134 are formed along the top surface of beam 122.

As noted above, the bias electrodes act as shields for AC voltages, reducing the parasitic capacitance between the drive electrode and the piezoresistor. The chance for parasitic capacitance can be further reduced by forming a shield electrode 136 on beam 122 between the drive electrode and piezoresistor. Shield electrode 136 preferably is maintained at ground. The grounded shield electrode thus provides a further shield for AC voltages.

Figure 11:
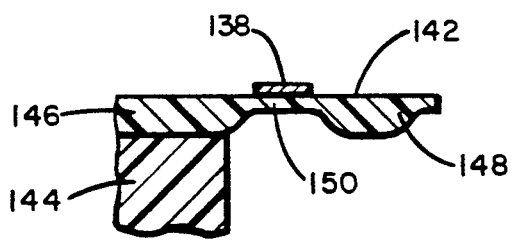
FIG. 11 is a diagrammatic view illustrating an accelerometer employing a resonant gauge in accordance with the present invention.

FIG. 11 illustrates an alternative use for a resonant strain gauge 138, namely in an accelerometer 140. Accelerometer 140 includes a silicon substrate 142 secured to a rigid base 144. The substrate includes a substantially rigid mounting portion 146, a substantially rigid proof mass 148, and a relatively narrow neck portion 150 about 0.5–1 mil (12–25 microns) thick between the mounting portion and proof mass. Neck portion 150 acts as a bridge, supporting proof mass 148 in cantilever fashion with respect to the rigid mounting portion. Resonant strain gauge 138, substantially similar to resonant gauge 32, is mounted to the accelerometer along its top surface at the neck. The strain gauge is oriented such that its elongate flexure beam (not shown) extends parallel to the length of neck 150, i.e. left to right as viewed in the figure. Typically, this is perpendicular to the direction of expected acceleration.

Acceleration of the device (in particular mounting portion 146), upward as viewed in FIG. 11, results in a downward or clockwise deflection of proof mass 148. The resulting tensile force upon gauge 138 imposes strain upon the beam, tending to elongate the beam and raise its natural resonant frequency. The amount of increase in frequency is proportional to the acceleration. Among other examples for such strain gauges are scales (e.g. with a weight suspended from a beam in lieu of proof mass 148), mass flow sensors, temperature sensors, humidity sensors and devices for measuring the density of air or other gases.

Figure 12:
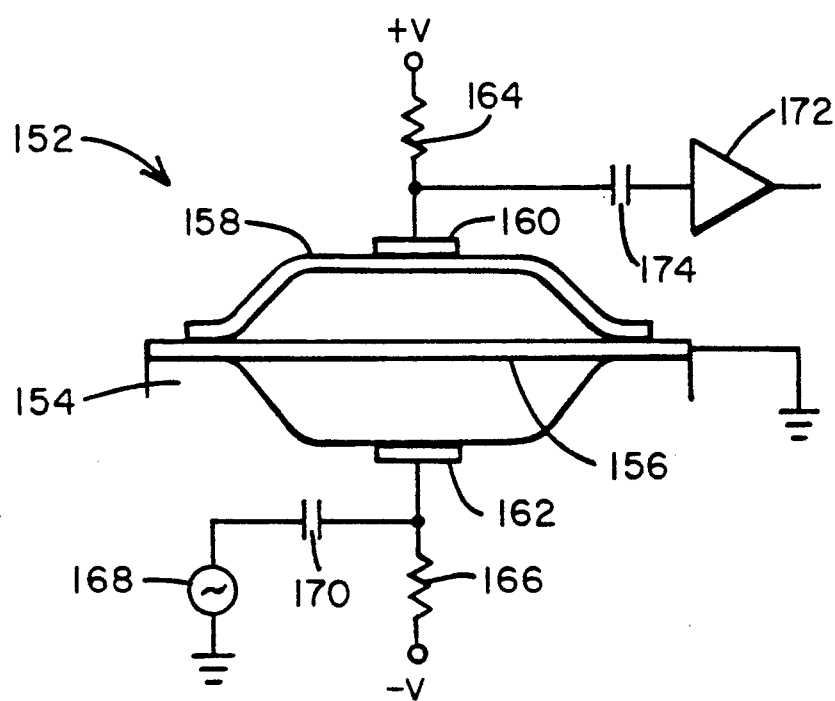
FIG. 12 is a schematic view of an alternative embodiment resonant gauge and beam position sensing circuitry.

FIG. 12 illustrates an alternative embodiment resonant strain gauge 152 including a substrate 154, an elongate beam 156, and a substantially rigid shell or cover 158. Opposite ends of the beam are fixed to the substrate, and the substrate and cover cooperate to provide a chamber about the beam as previously described, such that a medial region of the beam oscillates within the chamber. An upper bias electrode 160 is formed onto a surface portion of the cover, and similar lower bias electrode 162 is formed onto a surface of the substrate along the bottom of the chamber. In gauge 152, beam 156 is electrically conductive, and thus functions as both the oscillating beam and the beam electrode.

Bias electrodes 160 and 162 are spaced apart from beam 156 transversely, with the beam being approximately centered between the bias electrodes.

A substantially uniform and constant electrical field is maintained in the region about beam 156. More particularly, bias electrode 160 is maintained at a constant positive voltage level +V through a resistance 164, while lower bias electrode 162 is maintained at a constant voltage level −V through a resistance 166. The beam electrode, i.e. beam 156, is maintained at ground.

An oscillating (a.c.) drive voltage, indicated at 168, is applied to lower bias electrode 162 through a capacitor 170, which promotes mechanical oscillation of beam 156.

Oscillation of the beam periodically varies the capacitance between the beam and upper bias electrode 160. Bias electrode 160 is coupled to an input of a current sensitive amplifier 172 by a conductive path that includes a capacitor 174. Given the constant level +V, current sensed by amplifier 172 varies with the capacitance between bias electrode 160 and beam 156.

To insure substantially linear behavior, the absolute magnitude of voltage level V is at least twice the voltage peaks of oscillating drive signal 168. The d.c. bias on electrode 162 insures linear behavior and its attendant advantages as previously discussed. The d.c. bias on upper electrode 160 permits sensing the position of beam 156 relative to cover 158 (and substrate 154), based on the varying capacitance between electrode 160 and the beam. Current to amplifier 172 varies with the capacitance, and thus provides a direct indication of beam position.

It is to be understood that resonant gauge 152 can be incorporated into a circuit similar to that shown schematically in FIG. 7, to provide a closed loop for continually adjusting the drive signal frequency toward coincidence with the natural resonant frequency of beam 156. Further, a substantially insulative beam and a beam electrode mounted on the beam can be used in lieu of conductive beam 156, if desired.

Thus, in accordance with the present invention, a resonant strain gauge flexure is driven according to a linear applied force, for improved coincidence between the oscillating member and the periodically varying voltage signal that drives the oscillating member, for enhanced accuracy in frequency measurement. Further improving accuracy is the fact that the drive electrode and sense electrodes (or piezoresistor) are electrically isolated from one another in a manner that minimizes parasitic capacitance between these electrodes. The device is highly sensitive, in that a relatively minor variance in beam strain produces a substantial variance in natural resonant frequency. The gauges can be produced as monolithic semiconductor bodies, facilitating formation of microscopic oscillating beams within sealed vacuum chambers, for reliable yet low cost pressure transducers, accelerometers and other instruments.

What is claimed is:

1. An apparatus for sensing variations in strain, including:

a substantially rigid substrate, and a first bias electrode fixed with respect to a substrate surface portion of the substrate;

a flexure element elongate in a longitudinal direction, having a first region fixed with respect to the substrate and a second region free to oscillate at a resonant frequency, said resonant frequency varying with changes in strain due to external forces acting upon the flexure element, said flexure element being spaced apart from the first bias electrode transversely of the flexure element;

a beam electrode formed at the second region of the flexure element;

a substantially rigid cover fixed with respect to the substrate and having a cover surface portion transversely spaced apart from the flexure element and disposed on the opposite side of the flexure element from the substrate surface portion, and a second bias electrode fixed with respect to the cover at the cover surface portion;

a biasing means for biasing the first bias electrode and the second bias electrode at respective and different first and second substantially constant voltage levels, to generate a substantially uniform and constant electrical field in the region about the flexure element;

a position sensing means for generating a position signal indicating the position of the flexure element relative to the substrate and the cover; and an oscillating means for generating a drive signal comprising a periodically varying drive voltage signal and for providing the drive signal to one of the beam electrode, first bias electrode and second bias electrode, to cause oscillation of the flexure element relative to the substrate and the cover, said oscillating means receiving said position signal and controllably varying the frequency of the drive signal responsive to variations in the frequency of the position signal, thereby to adjust the drive signal frequency toward coincidence with said resonant frequency.

2. The apparatus of claim 1 wherein:
said first region comprises opposite end portions of the flexure element and said second region is a medial region of the flexure element between the end portions.

3. The apparatus of claim 2 wherein:
the drive signal is provided to the beam electrode.

4. The apparatus of claim 3 wherein:
the cover and substrate cooperate to form an enclosure containing the flexure element, and form a fluid seal for maintaining a substantial vacuum within the enclosure.

5. The apparatus of claim 3 wherein:
the flexure element comprises a beam formed of a semiconductor material.

6. The apparatus of claim 5 wherein:
the beam is formed of a fine grain, low stress polysilicon comprising a portion of a polysilicon beam layer deposited onto the substrate and thereafter etched to define the beam.

7. The apparatus of claim 5 wherein:
the cover layer is formed of a semiconductor material.

8. The apparatus of claim 7 wherein:
the cover is formed as a polysilicon cover layer deposited onto the polysilicon beam layer and a sacrificial spacer layer, with the spacer layer being removed after deposition of the carrier layer.

9. The apparatus of claim 1 wherein:
the substrate is formed of a semiconductor material.

10. The apparatus of claim 9 wherein:
the substrate is formed of silicon.

11. The apparatus of claim 8 wherein:
the first bias electrode, second bias electrode and beam electrode are formed by ion implantation onto the substrate, the cover layer, and the beam layer, respectively.

12. The apparatus of claim 5 wherein:
the beam is at least approximately transversely centered between the first bias electrode and the second bias electrode.

13. The apparatus of claim 12 wherein:
the drive signal varies about a center voltage level approximately midway between the first voltage level and the second voltage level.

14. The apparatus of claim 13 wherein:
the center voltage level is equal to ground and the first and second voltage levels are at least approximately equal in level and opposite in their polarity.

15. The apparatus of claim 1 wherein:
the position sensing means comprises a piezoresistor formed on the beam and electrically isolated from the drive electrode.

16. The apparatus of claim 15 wherein:
the piezoresistor is coplanar with and spaced apart from the drive electrode.

17. The apparatus of claim 16 further including:
a bias means for biasing the piezoresistor, wherein the drive signal varies about a center voltage level approximately mid-way between the first voltage level and the second voltage level, and wherein the bias means biases the piezoresistor symmetrically with respect to the center voltage level.

18. The apparatus of claim 15 further including:
a shielding means between the piezoresistor and the drive electrode.

19. The apparatus of claim 18 wherein:
the shielding means comprises a shield electrode on the flexure element and maintained at a.c. ground.

20. The apparatus of claim 2 wherein:
the drive signal is provided to one of the bias electrodes.

21. The apparatus of claim 20 wherein:
the first and second voltage levels are opposite in their polarity and have at least approximately the same magnitude.

22. The apparatus of claim 21 wherein:
the drive signal varies about a center voltage level equal to ground, and has amplitude less than the magnitude of the first and second voltage levels.

23. The apparatus of claim 1 wherein:
the position sensing means comprises a means for measuring changes in the capacitance between the beam electrode and one of said bias electrodes as the flexure element oscillates.

24. The apparatus of claim 23 wherein:
the conductive path couples the second bias electrode to the current sensitive amplifier, and the drive signal is provided to the first bias electrode.

25. A process for sensing strain along an elongate flexure element, including the steps of:
fixedly supporting an elongate flexure element with a major dimension of the flexure element oriented in a longitudinal direction, while a medial region of the flexure element remains free to oscillate;

generating a substantially uniform and constant electrical field in the region about the flexure element; and while maintaining the substantially uniform and constant electrical field, applying a drive signal to a drive electrode mounted on the flexure element to cause a periodic mechanical oscillation of the flexure element, said drive signal comprising a drive voltage that varies periodically according to a drive signal frequency substantially equal to the resonant frequency of said mechanical oscillation.

26. The process of claim 25 wherein:
said step of generating the substantially uniform and constant electrical field comprises positioning and maintaining a first bias electrode and a second bias electrode on opposite sides of the flexure element, maintaining the bias electrodes fixed and transversely spaced apart from the flexure element, and biasing the first and second electrodes at respective and different first and second voltage levels.

27. The apparatus of claim 25 wherein:
applying the drive signal to the drive electrode includes sensing the position of the flexure element and generating a periodic position signal indicating the position of the flexure element during said mechanical oscillation, and controllably adjusting the frequency of the drive signal toward coincidence with the frequency of the position signal, whereby the drive signal frequency tends to coincide with the resonant frequency of the mechanical oscillation.

28. A pressure sensing apparatus, including:
a substrate including a flexible diaphragm and a substantially rigid peripheral region surrounding and supporting the diaphragm;
a flexure element elongate in a longitudinal direction and having opposite first and second end portions fixed with respect to the substrate to position the flexure element along one side of the flexible diaphragm near said peripheral region, for longitudinal extension of the flexure element responsive to flexure of the diaphragm;
a cover fixed with respect to the substrate, said substrate and cover having respective first and second surface portions transversely spaced apart from the flexure element and on opposite sides of the flexure element;
a first bias electrode formed on the substrate at the first surface portion, a second bias electrode formed on the cover at the second surface portion, and a beam electrode formed upon the flexure element;
a biasing means for biasing the first bias electrode and the second bias electrode at respective and different first and second substantially constant voltage levels, to generate a substantially uniform and constant electrical field in the region about the flexure element;
a position sensing means for sensing the position of the flexure element relative to the substrate and the cover, and generating a periodic position signal indicating the position of the flexure element as it oscillates; and
an oscillating means for generating a periodic drive voltage signal, and for applying the drive signal to one of the beam electrode, the first bias electrode and the second bias electrode to cause a periodic mechanical oscillation of the flexure element relative to the substrate and the cover, said oscillating means receiving the position signal and controllably adjusting the frequency of the drive signal in response to variations in the position signal frequency, thereby to adjust the drive signal frequency toward coincidence with a resonant frequency of the mechanical oscillation.

29. The apparatus of claim 28 wherein:
the drive signal is applied to the beam electrode.

30. The apparatus of claim 29 wherein:
said diaphragm is substantially circular, and the flexure element is oriented with its major dimension radially of the diaphragm.

31. The apparatus of claim 30 wherein:
the position sensing means comprises a piezoresistor formed on the flexure element, coplanar with and spaced apart from the drive electrode.

32. The apparatus of claim 31 wherein:
the drive signal periodically varies about a center voltage level at least approximately equal to ground, the piezoresistor is biased symmetrically with respect to ground, and the first and second voltage levels are of substantially equal value and opposite polarity.

33. The apparatus of claim 31 further including:
a shielding means for reducing capacitive coupling of the piezoresistor with the drive electrode.

34. The apparatus of claim 33 wherein:
said shielding means comprises a shield electrode formed on the flexure element between the drive electrode and the piezoresistor, and means for maintaining the voltage of the shield electrode at ground.

35. An acceleration sensing device including:
a body subject to acceleration;
a proof mass;
a flexible bridging means for supporting the proof mass in cantilever fashion with respect to the body such that an acceleration of the body causes a deflection of the proof mass and a corresponding flexure of the bridging member to accommodate the deflection;
an elongate flexure element having opposite first and second end portions fixed to the bridging means along one side thereof, to orient the flexure element for longitudinal extension of the flexure element responsive to the flexure of the bridging means;
a cover fixed to the bridging means, said bridging means and said cover having respective first and second surface portions spaced apart from the flexure element transversely of the flexure element and on opposite sides of the flexure element;
a first bias electrode formed on the bridging means at the first surface portion, a second bias electrode formed on the cover at the second surface portion, and a flexure electrode formed upon the flexure element;
a biasing means for biasing the first bias electrode and the second bias electrode at respective and different first and second substantially constant voltage levels, to generate a substantially uniform and constant electrical field in the region about the flexure element;
a position sensing means for sensing the position of the flexure element relative to the bridging means and the cover, and generating a periodic position signal indicating the position of the flexure element as it oscillates; and
an oscillating means for generating a periodic drive voltage signal, and for applying the drive signal to one of the flexure electrode, first bias electrode and second bias electrode to cause a periodic mechanical oscillation of the flexure element relative to the bridging means and the cover, said oscillating means receiving the position signal and controllably adjusting the frequency of the drive signal in response to variation in the position signal frequency, thereby to adjust the drive signal frequency toward coincidence with a resonant frequency of the mechanical oscillation.

36. The device of claim 35 wherein:
the drive signal is applied to the flexure electrode.

37. The device of claim 35 wherein:
said body, proof mass and flexible bridging member comprise separate portions of a unitary substrate.

38. The device of claim 37 wherein:

the substrate is formed of silicon, the flexure element comprises a beam formed of a fine grain, low stress polysilicon, and the cover is formed of a polysilicon.

39. The device of claim 35 wherein:

the longitudinal extension of the flexure element is perpendicular to a direction of said acceleration of the body.

40. The device of claim 35 wherein:

the position sensing means comprises a piezoresistor formed on the flexure element coplanar with and spaced apart from the drive electrode.

41. The device of claim 40 wherein:

the drive signal periodically varies about a center voltage level at least approximately equal to ground, the piezoresistor is biased symmetrically with respect to ground, and the first and second voltage levels are of substantially equal value and opposite polarity.

42. The device of claim 35 wherein:

the position sensing means comprises a means for measuring changes in the capacitance between the flexure electrode and one of the first and second bias electrodes, responsive to mechanical oscillation of the flexure element.

43. The device of claim 35 further including:

a shielding means for reducing capacitive coupling of the piezoresistor with the drive electrode.

44. The device of claim 43 wherein:

said shielding means comprises a shield electrode formed on the flexure element between the drive electrode and the piezoresistor, and means for maintaining the voltage of the shield electrode at ground.

* * * * *

UNITED STATES PATENT AND TRADEMARK OFFICE
CERTIFICATE OF CORRECTION

PATENT NO. : 5,275,055
DATED : January 4, 1994
INVENTOR(S) : James D. Zook, David W. Burns It is certified that error appears in the above-indentified patent and that said Letters Patent is hereby corrected as shown below:

Column 13, line 4, before "applying" add --the step of--

Signed and Sealed this

Thirtieth Day of April, 1996

Attest:

BRUCE LEHMAN

*Attesting Officer*     Commissioner of Patents and Trademarks